(12) United States Patent
Olarig et al.

(10) Patent No.: US 12,481,339 B2
(45) Date of Patent: *Nov. 25, 2025

(54) SYSTEMS, METHODS, AND DEVICES FOR PROVIDING POWER TO DEVICES THROUGH CONNECTORS

(71) Applicant: Samsung Electronics Co., Ltd., Suwon-si (KR)

(72) Inventors: Sompong Paul Olarig, Pleasanton, CA (US); Matthew Bryson, Los Gatos, CA (US); Stephen Fischer, San Jose, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,385

(22) Filed: Mar. 4, 2024

(65) Prior Publication Data

US 2024/0288920 A1 Aug. 29, 2024

Related U.S. Application Data

(63) Continuation of application No. 16/920,417, filed on Jul. 2, 2020, now Pat. No. 11,921,555.
(Continued)

(51) Int. Cl.
*G06F 1/26* (2006.01)
*G06F 1/3215* (2019.01)
(Continued)

(52) U.S. Cl.
CPC ............ *G06F 1/266* (2013.01); *G06F 1/3215* (2013.01); *G06F 1/3228* (2013.01); *G06F 1/3296* (2013.01)

(58) Field of Classification Search
CPC .................................. G06F 1/26; G06F 1/32
See application file for complete search history.

(56) References Cited

U.S. PATENT DOCUMENTS 8,219,839 B2   7/2012   Akimoto
8,239,701 B2   8/2012   Day et al.
(Continued)

FOREIGN PATENT DOCUMENTS

CN   101986241 A   3/2011
CN   103023089 A   4/2013
(Continued)

OTHER PUBLICATIONS

Final Office Action for U.S. Appl. No. 16/920,417, mailed Dec. 8, 2021.
(Continued)

*Primary Examiner* — Paul B Yanchus, III
(74) *Attorney, Agent, or Firm* — Renaissance IP Law Group LLP

(57) ABSTRACT

A method may include coupling a device to a host through a connector, receiving, by a host controller, a request for boost power from the device, determining, by the host controller, an amount of surplus power available from one or more power sources arranged to provide power to the device through the connector, and allocating at least a portion of the surplus power to the device as boost power. The method may further include negotiating an amount of the boost power based on the amount of surplus power available from the one or more power sources. The method may further include monitoring a power consumption of the device, and reducing a total power allocation to the device based on the power consumption of the device.

20 Claims, 14 Drawing Sheets

Related U.S. Application Data

(60) Provisional application No. 63/044,353, filed on Jun. 25, 2020, provisional application No. 62/879,410, filed on Jul. 26, 2019.

(51) Int. Cl.
*G06F 1/3228* (2019.01)
*G06F 1/3296* (2019.01)

(56) References Cited

U.S. PATENT DOCUMENTS

| | | | |
|---|---|---|---|
| 8,504,853 B2 | 8/2013 | Carlsen et al. | |
| 8,933,670 B2 | 1/2015 | Ohtomo | |
| 9,459,670 B2 | 10/2016 | Rich et al. | |
| 9,692,923 B2 | 6/2017 | Achiwa et al. | |
| 9,874,914 B2 | 1/2018 | Obie et al. | |
| 10,359,822 B2 | 7/2019 | Choi et al. | |
| 10,804,800 B2 | 10/2020 | Muto | |
| 10,860,074 B2 | 12/2020 | Kuroi | |
| 11,921,555 B2 * | 3/2024 | Olarig | G06F 1/189 |
| 2006/0230299 A1 | 10/2006 | Zaretsky et al. | |
| 2008/0114997 A1 | 5/2008 | Chin | |
| 2009/0100275 A1 | 4/2009 | Chang et al. | |
| 2009/0113221 A1 | 4/2009 | Holle et al. | |
| 2010/0017242 A1 | 1/2010 | Hamilton, II et al. | |
| 2010/0205471 A1 | 8/2010 | Vavilala et al. | |
| 2011/0258382 A1 | 10/2011 | Cho | |
| 2011/0289327 A1 | 11/2011 | Nolterieke et al. | |
| 2012/0137158 A1 * | 5/2012 | Nelluri | H05K 7/1498 713/340 |
| 2014/0075212 A1 | 3/2014 | Urbina et al. | |
| 2015/0102668 A1 | 4/2015 | Jeon et al. | |
| 2017/0060211 A1 | 3/2017 | Urbina et al. | |
| 2017/0068307 A1 | 3/2017 | Vavilala et al. | |
| 2017/0077702 A1 | 3/2017 | Hsieh et al. | |
| 2018/0136705 A1 | 5/2018 | Obie et al. | |
| 2018/0136714 A1 | 5/2018 | Vavilala et al. | |
| 2019/0109720 A1 | 4/2019 | Olarig | |
| 2019/0138072 A1 | 5/2019 | Kuroi | |
| 2019/0280411 A1 | 9/2019 | Olarig et al. | |
| 2020/0026683 A1 | 1/2020 | Olarig | |
| 2020/0045843 A1 | 2/2020 | Schramm et al. | |
| 2020/0393885 A1 | 12/2020 | Ghosh et al. | |
| 2022/0147129 A1 * | 5/2022 | Cheng | G06F 1/3206 |

FOREIGN PATENT DOCUMENTS

| | | |
|---|---|---|
| CN | 103534694 A | 1/2014 |
| CN | 104641313 A | 5/2015 |
| CN | 106462188 A | 2/2017 |
| CN | 106527652 A | 3/2017 |
| CN | 109753467 A | 5/2019 |
| JP | 2003176442 A | 6/2003 |
| JP | 2010191595 A | 9/2010 |
| JP | 2011028720 A | 2/2011 |
| JP | 2015176442 A | 10/2015 |
| JP | 2018166373 A | 10/2018 |
| KR | 20110011501 A | 2/2011 |
| TW | 201411329 A | 3/2014 |

OTHER PUBLICATIONS

Final Office Action for U.S. Appl. No. 16/920,417, mailed Nov. 10, 2022.
Notice of Allowance for U.S. Appl. No. 16/920,417, mailed Oct. 31, 2023.
Office Action for U.S. Appl. No. 16/920,417, mailed Apr. 28, 2022.
Office Action for U.S. Appl. No. 16/920,417, mailed Jun. 4, 2021.
Office Action for U.S. Appl. No. 16/920,417, mailed Mar. 2, 2023.

* cited by examiner

SYSTEMS, METHODS, AND DEVICES FOR PROVIDING POWER TO DEVICES THROUGH CONNECTORS

CROSS-REFERENCE TO RELATED APPLICATIONS

This application is a continuation of U.S. patent application Ser. No. 16/920,417, filed Jul. 2, 2020, which claims priority to, and the benefit of, U.S. Provisional Patent Application Ser. No. 62/879,410, filed Jul. 26, 2019, and U.S. Provisional Patent Application Ser. No. 63/044,353, filed Jun. 25, 2020, all of which are incorporated by reference.

TECHNICAL FIELD

This disclosure relates generally to providing power to devices, and more specifically to systems, methods, and devices for providing power to devices through connectors.

BACKGROUND

Devices such as storage devices, graphics processing units (GPUs), and/or the like may be coupled to host systems through connectors. A host system may include one or more power supply units (PSUs) which may provide power to the devices through the connectors.

The above information disclosed in this Background section is only for enhancement of understanding of the background of the invention and therefore it may contain information that does not constitute prior art.

SUMMARY

A method may include coupling a device to a host through a connector, receiving, by a host controller, a request for power for the device, determining, by the host controller, an amount of surplus power available from one or more power sources to the device through the connector, and allocating at least a portion of the surplus power to the device. The request may be for a first amount of power, and the method may further include denying, by the host, the request for the first amount of power, and sending, from the host, an offer for a second amount of power based, at least in part, on the amount of surplus power available. The method may further comprise sending, to the host, an acceptance of the second amount of power. The method may further include deallocating at least a portion of the power from the device, or a portion of the unused standard power allocation, and returning the at least a portion of the power to the amount of the surplus power. The device may be a first device, and the method may further include reallocating at least a portion of the power to a second device coupled to the one or more power sources through a second connector. The power may be allocated to the device for an event. The method may further include determining the end of the event, and deallocating the power for the device based on determining the end of the event. The end of the event may be determined, at least in part, by the device. The end of the event may be determined, at least in part, by the host. The method may further include monitoring a power consumption of the device, and reducing a total power allocation of the device based on the power consumption of the device. The device may be a first device, and the method may further include coupling a second device to the host through a second connector arranged to provide power to the second device from the one or more power sources, and allocating a second amount of power to the second device. The method may further include deallocating at least a portion of the second amount of power from the second device, and reallocating the at least a portion of the second amount of power to the first device. At least a portion of the second amount of power may be deallocated from the second device based on a power consumption of the second device.

A system may include a connector capable of being connected to a first device to provide power to the first device from one or more power sources, and a controller configured to receive a request for power from the device, determine an amount of surplus power available, and allocate at least a portion of the surplus power to the device. The controller may be configured to allocate a baseline amount of power to the device. The baseline amount of power may be determined, at least in part, by a type of the connector. The baseline amount of power may be determined, at least in part, by one or more presence detect pins on the first connector. The baseline amount of power may be determined, at least in part, by communicating with the device through the connector. The controller may include a host central processing unit running an application. The controller may include a service processor. The service processor may include a baseboard management controller.

A device may include a connector arranged to be coupled to a host and receive power through the connector from one or more power sources, and a device controller configured to transmit a request to the host for power from the one or more power sources. The device controller may be configured to negotiate an amount of the power with the host. The device may further include a power metering unit configured to measure a power consumption of the device and report the power consumption to the host.

BRIEF DESCRIPTION OF THE DRAWINGS

The figures are not necessarily drawn to scale and elements of similar structures or functions are generally represented by like reference numerals for illustrative purposes throughout the figures. The figures are only intended to facilitate the description of the various embodiments described herein. The figures do not describe every aspect of the teachings disclosed herein and do not limit the scope of the claims. To prevent the drawing from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

DETAILED DESCRIPTION

Figure 1:
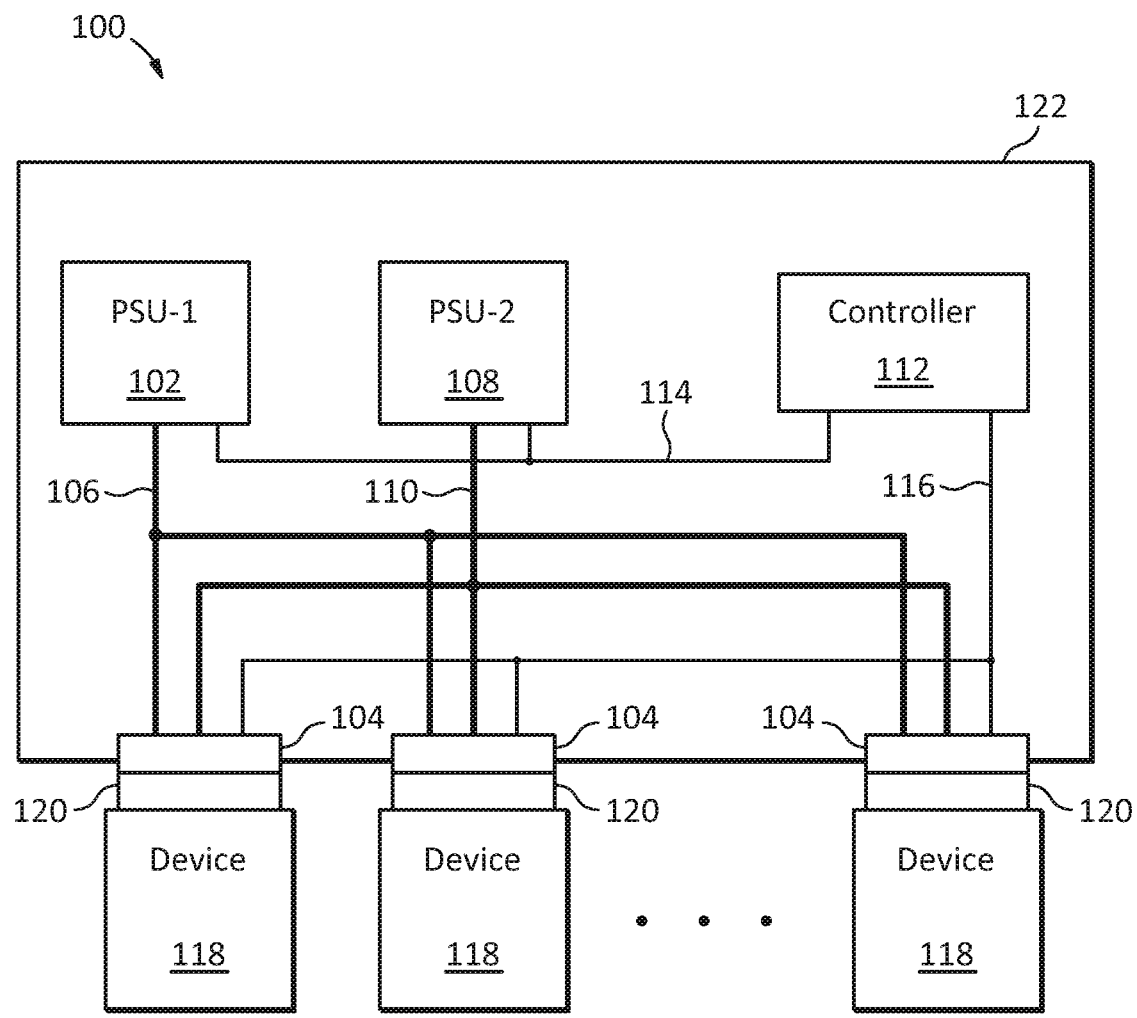
FIG. 1 illustrates an example embodiment of a host system that may allocate boost power to devices though connectors according to this disclosure.

In some embodiments, a host may monitor surplus power and allocate it to pluggable devices such as storage devices, compute devices, and/or the like, for use, for example, as additional boost power above the pluggable device's normal or baseline power allocation. A pluggable device may use the boost power on a short and/or long term basis, for example, to improve one or more performance metrics such as compute speed, data transfer bandwidth, memory access speed, and/or the like. Surplus power may be available, for example, by one or more underutilized power supply units (PSUs), a redundant PSU configuration, an increase in the amount of power available from one or more PSUs, a decrease in the amount of power allocated to other devices, and/or for other reasons and/or combinations thereof.

In some embodiments, allocation or deallocation of boost power may be initiated by the device, the host, or any combination thereof. For example, a computational storage device may request temporary boost power to perform a computational task. The host may allocate boost power to the device in response to the request, and then deallocate the boost power when the device notifies the host that the task is complete. In another example, however, the host may deallocate boost power to the computational storage device before the task is complete, for example, in response to a loss of power available from a PSU. In some embodiments, a request for an allocation or deallocation of power may come from any source of a request, including sources other than a host or a device. For example, a user may send a request to a host for an increase or decrease in the power allocation to one or more devices.

In some embodiments, the amount of boost power allocated to a device may be negotiated by the host and the device. For example, a device may request a specific amount of boost power. The host may decline the request, for example, because the amount of boost power requested exceeds the available surplus power. However, the host may offer a reduced amount of boost power, which, if accepted by the device, may be allocated to the device.

A host may implement a wide variety of different power allocation strategies according to this disclosure. For example, in some embodiments, a host may implement a relatively passive power allocation strategy in which it may accept the total baseline power allocation for all devices determined, for example, at system reset (which may be updated based on hot insertions and removals), and wait for devices to request boost power. It may also passively wait for devices to report that they require less than their allocated baseline power, and then return any excess baseline power to a pool of available power.

In some other embodiments, a host may implement a relatively aggressive power allocation strategy. For example, a host may actively attempt to identify unused and/or under-used portions of the baseline power allocation of some devices, and reallocate it to make it available as boost power to other devices. For example, the host may monitor the power consumption of devices that implement a power monitoring feature. If the host identifies a device that uses less than its baseline power allocation, it may command or request that the device reduce its baseline power allocation. As another example, a host may monitor the actual power consumed by a device operating in boost mode. If the host determines that the device is using less than its allocated boost power, the host may command or request that the device exit boost mode, and/or the host may reduce the amount of the device's boost power allocation.

A host may also implement a power allocation strategy based, at least in part, on priorities, service level agreements (SLAs), and/or the like. For example, in some embodiments, a host may receive a request for boost power from a first, high priority device. If the host does not have enough surplus power to accommodate the request, the host may deallocate power (e.g., reduce the baseline and/or boost power allocation) from a second, lower priority device. The deallocated power may then be reallocated to the second, higher priority device. As another example, in some embodiments, a device may be subject to an SLA that may specify that a device may only operate when there is surplus power available. Thus, the device may have little or no baseline power allocation, and may periodically request a boost power allocation, which the host may allocate when there is surplus power available, and may deallocate, for example, when another device requests boost power.

In some embodiments, a host may implement one or more of the power allocation strategies described herein, as well as other strategies and/or any combinations thereof.

Some example embodiments of systems, processes, methods, and/or the like illustrating some possible implementation details according to this disclosure are described below. These examples are provided for purposes of illustrating the principles of this disclosure, but the principles are not limited to these embodiments, implementation details, and/or the like.

FIG. 1 illustrates an example embodiment of a host system that may allocate boost power to devices though connectors according to this disclosure. The host system 100 illustrated in FIG. 1 may include a first PSU 102 arranged to provide power to connectors 104 through a first power distribution bus 106. A second PSU 108 may be arranged to provide power to the connectors 104 though a second power distribution bus 110. One or more devices 118 may be connected to the host 100 through connectors 120 which may be connected to corresponding connectors 104. A controller 112, which may also be referred to as a host controller, may interface with the PSUs through one or more communication channels 114. The controller 112 may interface with the connectors 104 through one or more communication channels 116. Although illustrated in a bus-like configuration, the communications channels 114 and 116 may be implemented as individual channels between the controller 112 and each of the PSUs 102 and 108 and each of the connectors 104, and/or in any other configuration.

The host 100 may be physically implemented in a structure 122 such as a chassis, a rack, and/or the like, or any combination thereof. For example, in some embodiments, the structure 122 may be implemented with a server-type chassis that may be mounted in a rack in a data center.

In some embodiments, some of the components of host system 100 may be physically configured as subassemblies. For example, in some embodiments, the controller 112, connectors 104 and power distribution buses 106 and 110 may be fabricated on one or more circuit boards such as switch boards, motherboards, midplanes, backplanes, interface boards, and/or the like.

The host system 100 is illustrated with two PSUs 102 and 108, but any number of PSUs may be used, including just one, and any number of power distribution buses may be used in any configuration. For example, multiple PSUs may share a common bus. Moreover, the PSUs need not be physically located in the structure 122. For example, in a chassis implementation, the PSUs 102 and 108 may be located at the bottom of a rack in which the chassis is mounted, in an adjacent chassis, or any other location. In some embodiments, some or all of the available system power may be provided in the form of power from an unspecified source. For example, a datacenter may provide a chassis, rack, and/or the like, with an amount of power at 12 V, 48 V, and/or the like.

The power distribution buses 106 and 110 may be implemented with bus bars, cables, board-to-board power connectors, and/or the like or any combination thereof. Power from the power distribution buses 106 and 110 may be provided to the connectors 104 by using existing power pins, adding additional power pins, redefining reserved or unconnected pins as power pins, and/or in any other manner or combination thereof. In some embodiments, a configuration used to provide boost power to a connector may be influenced by implementation details and/or operating conditions such as the amount of boost power that may be allocated to a device using the connector. For example, a U.2 connector may provide a standard maximum power of 25 W through the 12 V pins P13, P14, and P15. In some embodiments, a U.2 connector may be configured to provide an amount of boost power above the standard 25 W maximum, for example, by increasing the amount of current supplied through the 12 V pins P13, P14, and P15. For even higher amounts of boost power, one or more unused 5V pins P7, P8, and P9 and/or reserved pins such as E15 and/or S16 may be used to provide additional 12 V boost power to a device through the connector instead of, or in addition to, providing additional current through the 12 V pins P13, P14, and P15.

The connectors 104 may be implemented with any standard or nonstandard connectors, with any physical and/or electrical configuration, or any combination thereof. Some examples may include scalable connectors and form factors such as those defined by the SFF-TA-100X specifications where X may be 2, 6, 7, 8, etc., as well as U.2 connectors, U.3 connectors, M.2 connectors, and/or the like. For example, SFF-TA-1002 may specify 1C, 2C, and 4C connectors, while SFF-TA-1006, SFF-TA-1-1007, and SFF-TA-1-1008 may specify various form factors such as E1.S, E1.L, and E3.x (short and long), respectively.

The controller 112 may perform any functions associated with providing boost power to one or more devices through connectors as disclosed herein. This may include monitoring and/or managing the power available from the PSUs 102 and 108 and/or any other sources of power within the host system 100. It may also include monitoring and or managing the allocation of baseline power and/or boost power to the devices 118 and/or any other loads within the host system 100. The controller 112 may also respond to requests for boost power from, and/or negotiate boost power allocation to, the devices 118, as well as deallocate boost power in response to various conditions such as a loss of power from one of the PSUs 102 and 108 and/or a notification of from a device 118 that boost power is no longer required or warranted.

The controller 112 may be implemented in hardware, software or any combination thereof. For example, in some embodiments, the controller 112 may be implemented as a service processor, such as a baseboard management controller (BMC). In some embodiments, the controller 112 may be implemented with a central processing unit (CPU) running an application to perform the functions of the controller 112. Although shown as a single, separate component, the functions of the controller 112 may be distributed among multiple components and/or may be integrated into one or more other components. For example, in some embodiments, the host system 100 may be implemented as part of a storage controller having a motherboard. In such an embodiment, a CPU that implements the storage controller functionality on the motherboard may also implement some or all of the boost power management functionality described in this disclosure.

The communication channels 114 and 116 may be implemented with any hardware components, software components, communication protocols, and/or the like, or combinations thereof. Moreover, the channels 114 and 116 may be implemented as individual channels that may be separate from each other and/or other channels, or they may be integrated into other communication channels that may be used by the devices 118. For example, in some embodiments, either or both of the channels 114 and 116 may be implemented with a System Management Bus (SMBus), a low pin count (LPC) bus, general purpose input/output (GPIO) LINES, and/or the like, using, for example, dedicated conductors such as Power Management Bus (PMBus) between the controller 112 and the connectors 104 and/or PSUs 102 and 108. As another example, in some embodiments, one or more of the devices 118 may communicate with a motherboard CPU or service processor such as a BMC through Peripheral Component Interconnect Express (PCIe) links using, for example, a Nonvolatile Memory Express (NVMe) protocol. In some embodiments, either or both of the channels 114 and 116 may be implemented with the NVMe Management Interface (NVMe-MI) protocol using PCIe links, an SMBus connection, and/or the like.

The host system 100 may further include circuitry and/or other apparatus to enable the controller 112 to sense the presence, types, form factors, and/or the like of devices 118 plugged into the connectors 104. For example, in embodiments that may use one or more connectors with presence detect pins, a complex programmable logic device (CPLD) or other logic device may be used to sense the state of one or more presence detect pins. The states of any presence detect pins may be reported to the controller 112 through, for example, an inter-integrated circuit (I2C) bus, GPIO pins, and/or the like.

The devices 118 may include any type of device that may connect to, and draw power from, the host system 100 through a connector. Some examples include storage devices such as hard disk drives (HDDs), solid state drives (SSDs), and/or the like. Some additional examples include compute devices such as graphics processing units (GPUs), high performance computing (HPC) devices, and/or the like. Some other examples include hybrid devices such as computational storage devices which may combine storage media with compute resources.

Figure 2:
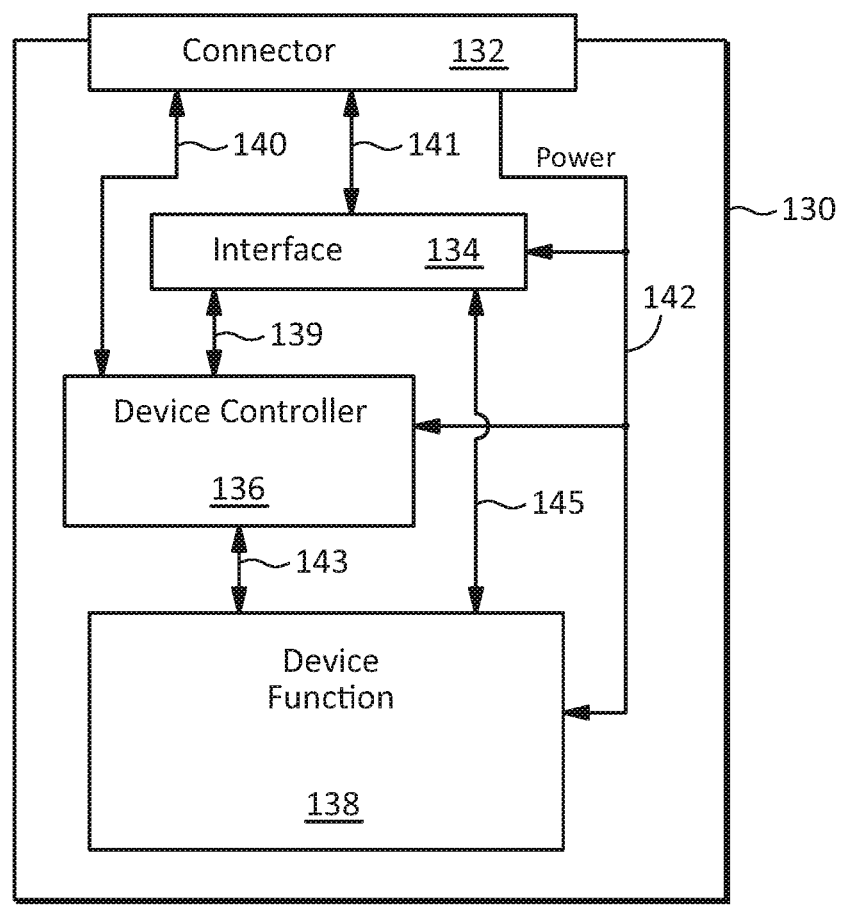
FIG. 2 illustrates an embodiment of a device that may receive boost power though a connector according to this disclosure.

FIG. 2 illustrates an embodiment of a device that may receive boost power though a connector according to this disclosure. The device 130 illustrated in FIG. 2 may be used, for example, as one of the devices 118 illustrated in FIG. 1. Referring to FIG. 2, the device 130 may include a connector 132, an interface 134, a device controller 136 and a device function block 138. The device function block 138 may include any hardware, software, and/or combination thereof for performing one or more functions of the device. For example, in an SSD, the device function block 138 may include a solid state storage media, a flash translation layer (FTL), and/or the like. As another example, for a GPU, the device function block may include a hardware graphics processing pipeline and supporting circuitry.

The connector 132 may be implemented with any standard or custom connectors, with any physical and/or electrical configuration, or any combination thereof to connect the device 130 to a host, for example, by connecting to one of the connectors 104 of host system 100 illustrated in FIG. 1. The device 130 may also include one or more power supply rails 142 which may receive system power through the connector 132. The power may be distributed to the various components in the device 130.

Referring again to FIG. 2, the interface 134 be implemented with any type of communication interface for connecting the device function block 138 to apparatus in a host system to which it is connected through interconnects 141 and 145. Examples include storage and/or general purpose interfaces and/or protocols such as Serial Advanced Technology Attachment (SATA), Small Computer Systems Interface (SCSI), Serial Attached SCSI (SAS), PCIe, NVMe, and/or the like, as well as network interfaces and/or protocols such as Ethernet, Fibre Channel, InfiniBand, Non-Volatile Memory Express over Fabric (NVMe-oF) and/or the like.

The device controller 136 may be implemented in hardware, software or any combination thereof, and may communicate with the device function block 138 though any type of interconnect 143. The device controller 136 may perform any functions associated with boost power operation as disclosed herein. This may include requesting and/or negotiating a boost power allocation, responding to a deallocation of boost power, monitoring and/or reporting device power consumption, and/or the like. The device controller 136 is shown as a separate component, but it may be implemented partially or entirely integral with one or more other components.

In some embodiments, the device controller 136 may communicate with a host through a communication channel 139 that may use the interface 134. Alternatively, or additionally, the device controller 136 may communicate with a host using a communication channel 140 which may be implemented, for example, with SMBus, LPC bus, and/or the like.

Figure 3:
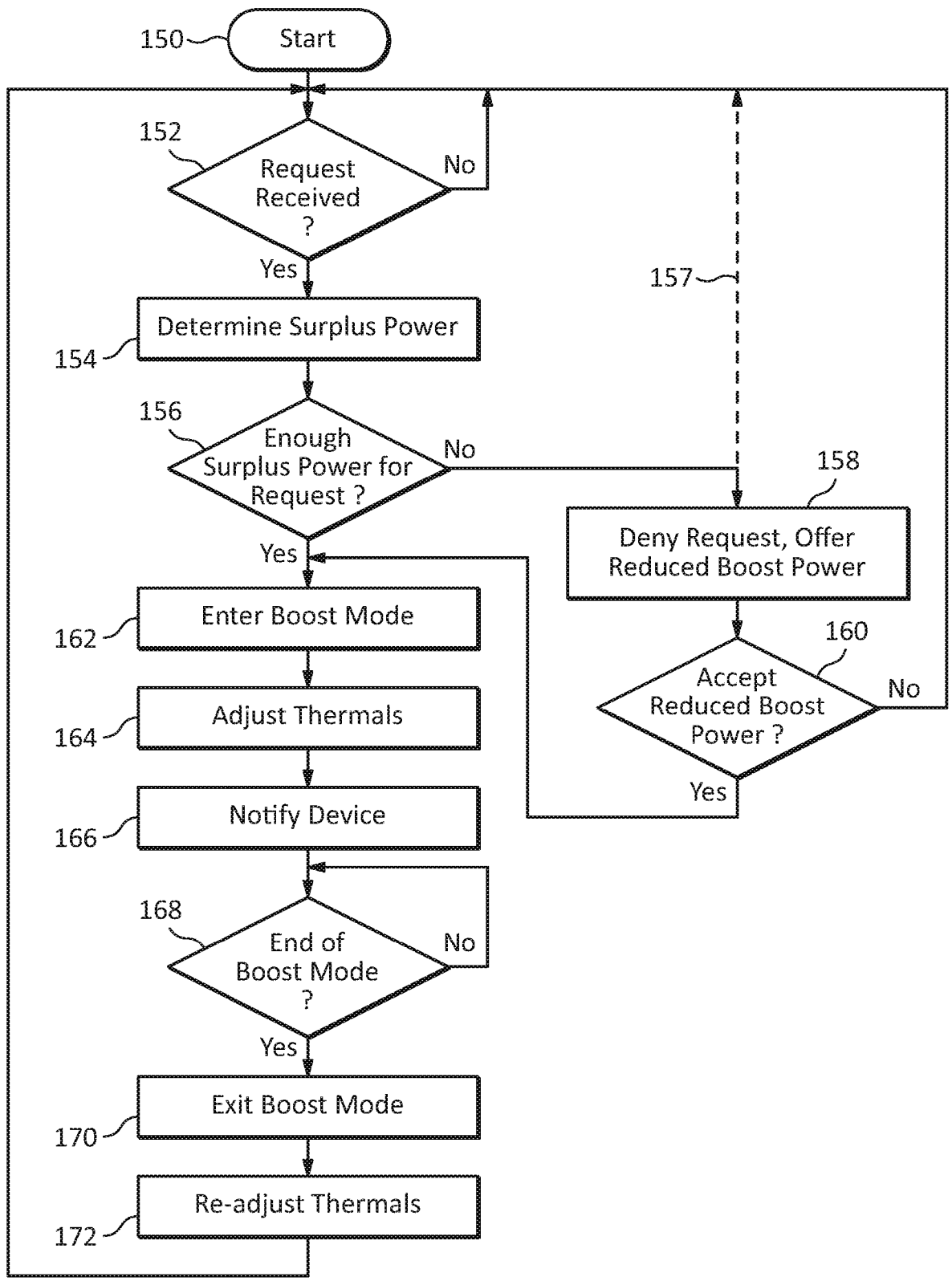
FIG. 3 illustrates a flowchart of an embodiment of a method of boost power allocation according to this disclosure.

FIG. 3 illustrates a flowchart of an embodiment of a method of boost power allocation according to this disclosure. The method may start at operation 150. At operation 152, a host controller may wait to receive a request for a specific amount of boost power from one or more devices connected to the host. When the host controller receives a request, it may begin a negotiation process, and the method may proceed to operation 154. At operation 154, the host controller may determine the amount of surplus power available in the host system. This may be determined, for example, by first determining the total amount of power available from one or more PSUs configured in the host system, then subtracting the total amount of power currently allocated to devices connected to the host system. At operation 156, the host controller may determine whether the available surplus power is adequate to accommodate the request.

In some implementations, if there is not enough surplus power (i.e., the requested power exceeds the available power), the host controller may deny the request (e.g., by not acknowledging the request, or by explicitly denying the request) and return to operation 152 as shown by the dashed line 157, thereby terminating the negotiation process. In other implementations, if the requested power exceeds the surplus power, but there is still some surplus power available, the method may proceed to operation 158 where the host controller may deny the request, but may Discontinue the negotiation process by offering all or a portion of the available surplus power to the device. At operation 160, if the device declines the offer, the negotiation process ends, and the method returns to operation 152. However, if the device accepts the offered amount of surplus power, method may proceed to operation 162 where the device enters boost mode.

After operation 154, if there is adequate surplus power, the method proceeds to operation 162. At operation 162, the host controller may update a record indicating that the requesting device is in boost mode and further indicated whether the boost mode is indefinite (permanent), or temporary (a one-time event). For a temporary boost mode, the host controller may initialize a timer to automatically deallocate the boost power from the requesting device at the end of the boost event. Also at operation 162, the host controller may update a record with the new increased maximum power level allocated to the device, and/or add the boost mode power level to a running total of allocated power for the host system.

In some embodiments, the method may proceed to operation 164 where the host controller may adjust thermal aspects of the device and/or host system. For example, depending on the implementation details, the boost power consumption of the device may cause the device to dissipate more heat. In some embodiments, for relatively short boost events, the temperature of the device may not change significantly. However, for relatively long or permanent events, the temperature of the device may increase, for example, to level that may reduce the reliability or performance of the device. Thus, the host controller may provide additional cooling to the device, for example, by turning on and/or increasing the speed of one or more fans associated with the device and/or a structure in which the device is located.

After completing operation 164, the method may proceed to operation 166 where the host controller may notify the device, for example, that the device's request for boost power has been approved, the accepted offer for reduced boost power has been acknowledged, and/or any other action that may indicate that the device may begin consuming power at the increased level in boost mode.

At operation 168, the host controller may wait for the completion of the boost event. For example, with a temporary boost event, the host controller may wait for the timer that was initialized in operation 162 to time out. As another example, with an indefinite boost event, the host controller may wait to receive a notification from the device that the device no longer needs or may use the boost power allocation. In some embodiments, the host controller may terminate boost mode for a device based on other factors such as observing the device overheating, observing that the device power consumption has dropped to a lower level and remained there for a significant period of time, determining that some or all of the boost power should be reallocated to a different device, and/or the like.

At operation 170, the host controller may begin a process in which the device exits boost mode. If the boost mode event is being terminated by the host controller rather than the device, the host controller may notify the device that boost power is being terminated. The host controller may update a record indicating that the device is no longer in boost mode. The host controller may also update a record indicating the new reduced maximum power level allocated to the device. The host controller may also return the boost power to a pool, for example, by subtracting the boost power level from the running total of allocated power for the host system.

In some embodiments, at operation 172, the host controller may readjust thermal aspects of the device and/or host system, for example, by turning off and/or reducing the speed of one or more fans associated with the device and/or a structure in which the device is located. The method may then return to operation 152.

In some embodiments, the method illustrated in FIG. 3 may be implemented as a single instance of a method which may respond to requests from, and/or allocate boost power to, a single device. The method illustrated in FIG. 3 may also be implemented in multiple instances, for example, for responding to requests from, and/or allocating boost power to, multiple devices. In other embodiments, the method illustrated in FIG. 3 may be implemented with a single instance that may be configured, for example, to accommodate boost power requests from multiple devices. For example, while the method illustrated in FIG. 3 may be waiting for the end of a boost event for one device at operation 168, it may also be processing boost power requests from, and/or allocating boost power, to other devices.

The operations and/or components described with respect to the embodiment illustrated in FIG. 3, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

In some embodiments, the amount of surplus power that may be provided as boost power to devices through connectors may be determined as the total amount of available power in the host system minus the total amount of power that has been allocated to devices. In some embodiments, an amount of system overhead power may be omitted from the power that may otherwise be available from one or more PSUs. For example, a host system may include components such as a service processor, network interfaces and/or switches, CPUs, memory, system monitoring circuitry, cooling equipment, and/or the like, which may consume power and therefore, make it unavailable as boost power to devices through connectors. Moreover, a percentage of power that may otherwise be available as boost power may be omitted from the available power, for example, to provide additional cooling for devices in boost mode.

In some embodiments, multiple PSUs may provide flexibility for different power configurations. For example, referring to the embodiment illustrated in FIG. 1, in a first mode without redundancy, the full output power from both PSUs 102 and 108 may be made available for use by devices 118. This may provide a relatively large amount of surplus power for use as boost power. In a second, high availability (HA) mode, one of the PSUs may be configured as a redundant (backup) PSU to the other (active) PSU, thereby reducing the amount of surplus power available as boost power for devices 118. In this mode, the surplus power may only be equal, for example, to the headroom between the maximum power capacity of the active PSU and the current power allocation to the devices 118. In some embodiments, in the event of power loss from one or more redundant PSUs, one or more devices operating in a boost mode may be instructed by a host controller to reduce their power consumption to their baseline power allocation or to a reduced boost power level that may be lower than the original boost power level. In some embodiments, in the event of power loss from one or more redundant PSUs, boost power may be disallowed for all or some devices, or boost power may be disallowed for all or some devices unless there is enough headroom on one or more remaining active PSUs.

Table 1 illustrates an example of power allocation decisions that may be made by an embodiment of a host system having two PSUs according to this disclosure. The first column indicates the type of boost mode. The second column indicates whether the boost mode may be implemented when only one PSU is available, for example due to the loss of one of the PSUs, or because the two PSUs are configured for redundant operation. The third column indicates whether the boost mode may be implemented when both PSUs are available.

TABLE 1

| Boost Mode | 1 PSU | 2 PSUs |
| --- | --- | --- |
| No | OK | OK |
| Yes (permanent request) | Determined based on surplus power | OK |
| Yes (one time event) | Determined based on surplus power | OK |

In some embodiments, there may be one or more causes of surplus power in a host system. One potential cause of surplus power may be a host system configuration in which not every connector is populated with a device. For example, a system such as a chassis or rack in a data center may have a specific number of device slots, each slot having a connector with a maximum specified power that may be drawn by a device plugged into the connector. The host system may have one or more PSUs having adequate capacity (e.g., in a redundant or non-redundant configuration) to provide the total power required when every slot is populated with a device drawing the maximum power for the corresponding connector. However, if one or more of the slots are not populated with a device, the power that would otherwise be allocated to those one or more empty slots may be available for use as boost power by devices in one or more of the other connectors. In some implementations, power may be disabled to an unused slot and/or connector.

Another potential cause of surplus power may be one or more devices that may require or consume less than the maximum specified power for a connector. For example, a host system may include one or more scalable connectors that may accept different types of devices having different power requirements. The host system may be configured with one or more PSUs having adequate capacity to provide the total power required when every slot is populated with a device drawing the maximum power for the corresponding connector. However, if a device having a lower maximum power draw that the maximum power for the connector is plugged into the connector (as detected, for example, by the state of one or more presence detect pins on the connector), the difference between the maximum power for the connector and the maximum power draw of the actual device plugged into the connector may be available as surplus power. As another example, a device plugged into a connector may notify the host controller that it requires less than the maximum power allocated for the connector. The difference between the allocated power and the devices actual power requirement may be returned to the pool of available power and/or reallocated to another device that may request boost power.

In some embodiments, for a host controller to determine a total power allocation for some or all devices plugged into connectors, the host controller may first determine a baseline power allocation for the devices. In some embodiments, a baseline power allocation may depend on parameters such as, for example, the type and number of each connector in the host system, the state of any presence detect pins for each connector, the host controller's ability to detect the presence, type, form factor and/or the like of a device in a connector that may not have presence detect pins.

For example, for each occupied U.2 connector in a host system, the host controller may allocate 25 watts of baseline power. As another example, for each SFF-TA-100X connector in a host system, the host controller may allocate 12, 16, 20 25, 40, or 70 watts or some other amount of baseline power depending on the state of various presence detect pins, as well as one or more tests to determine the length, thickness, and/or other parameter of the connected device. As a further example, if a connector does not have any presence detect pins, and the host controller is not able to detect whether a device is plugged into the connector, the host controller may allocate the maximum amount of baseline power to the connector, regardless of whether a device is plugged into the connector.

In some embodiments, an initial baseline power allocation may be determined at system reset, and then updated later based on hot insertions and/or removals of devices.

Figure 4:
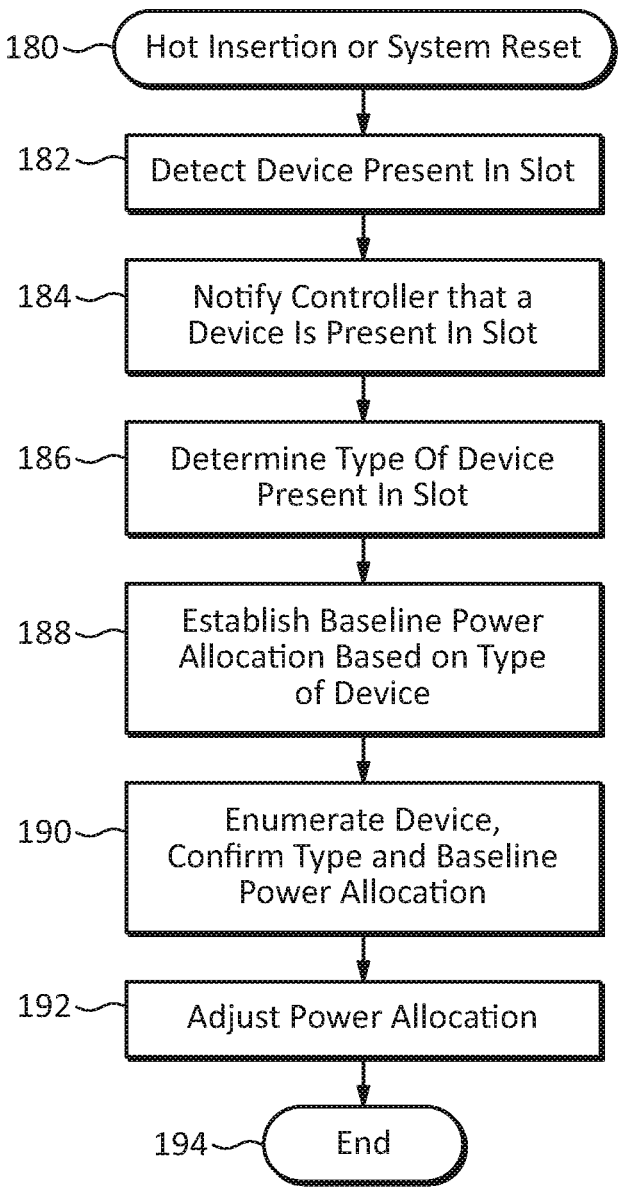
FIG. 4 illustrates a flowchart of an embodiment of a method for enumerating and determining a baseline power allocation for a device according to this disclosure.

FIG. 4 illustrates a flowchart of an embodiment of a method for enumerating and determining a baseline power allocation for a device according to this disclosure. The method may begin at operation 180 with either a system reset or a hot insertion of the device into a slot having a connector that may receive powered from one or more PSUs in the host system. At operation 182, the method may detect the presence of the device in the slot (i.e., plugged into the connector), for example, by a CPLD reading the state of a presence detect pin on the connector. At operation 184, a host controller such as a service processor which may be implemented, for example, with a BMC, may be notified of the presence of the device in the slot. At operation 186, the host controller may determine the type of device present in the slot. This determination may be based, for example, on the type of connector (e.g., a standard connector, scalable connector, and/or the like), as well as one or more presence detect pins that may indicate the type of device connected to a connector that may accommodate multiple types of devices. At operation 188, the host controller may establish a baseline power allocation based on the type of device determined to be in the slot. At operation 190, the host controller may perform an enumeration process on the device, which may enable the host controller to confirm the device type and/or the actual baseline power allocation for the device. At operation 192, the host controller may adjust the power allocation for the device, for example, based on factors such as a boost power request, a notification from the device that it may require a lower power allocation than the baseline power allocation, and/or the like. The method may end at operation 194.

In some embodiments, the method illustrated in FIG. 4 may be repeated for one or more other devices that may have been hot inserted, or that may not have been enumerated yet during a system reset.

Figure 5:
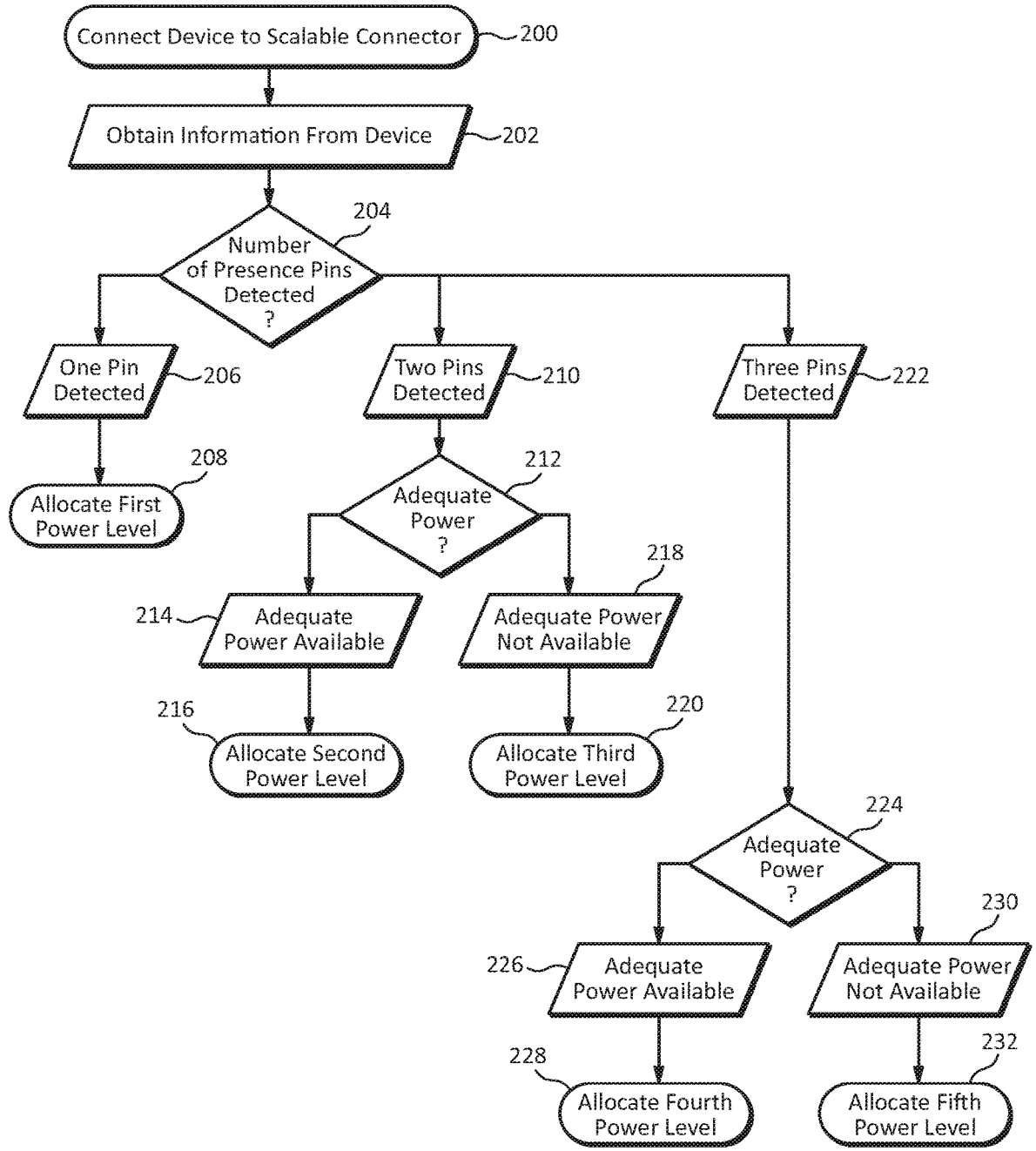
FIG. 5 illustrates a flowchart of an example embodiment of a method for determining a baseline power allocation for a device connected to a host through a scalable connector according to this disclosure.

FIG. 5 illustrates a flowchart of an example embodiment of a method for determining a baseline power allocation for a device connected to a host system through a scalable connector according to this disclosure. In some embodiments, the type of devices that may be connected to the host system through a scalable connector may have different maximum power levels depending on factors such as the form factor of the device, the thickness of the device, the number of presence detect pins that may be detectable when the device is plugged into the connector, and/or the like. The method may begin at operation 200 when a device is plugged into a scalable connector in the host system. At operation 202, a host controller may obtain information such as the device form factor, thickness, and/or the like from the device using a communication channel such as, for example, an SMBus via Vital Product Data (VPD). At operation 204, the host controller may sense the number of presence detect pins that may be detected through the scalable connector. The presence detect pins may be sensed, for example, using a CPLD. After operation 204, the host controller may determine at operation 206 that one presence detect was sensed. In some embodiments, this may indicate that the device is one of one or more types of devices that may have a first maximum power level. Thus, at operation 208, the host controller may allocate the first maximum power level as the baseline power allocation for the device, and the method may terminate.

Alternatively, after operation 204, the host controller may determine at operation 210 that two presence detect pins were sensed. In some embodiments, this may indicate that the device is one of one or more types of devices that may have a second baseline maximum power level. However, some of these types of devices may be configured for a third, lower maximum power level depending, for example, on the amount of surplus power available in the host system. Thus, at operation 212, the host controller may calculate if there is enough surplus power to provide the second maximum power level. At operation 214, the host controller may determine that enough surplus power is available, and at operation 216, the host controller may allocate the second maximum power level as the baseline power allocation for the device, and the method may terminate. Alternatively, at operation 218, the host controller may determine that enough surplus power is not available, and at operation 220, the host controller may allocate the third maximum power level as the baseline power allocation for the device, and the method may terminate.

Alternatively, after operation 204, the host controller may determine at operation 222 that three presence detect pins were sensed. In some embodiments, this may indicate that the device is one of one or more types of devices that may have a fourth baseline maximum power level. However, some of these types of devices may be configured for a fifth, lower maximum power level depending, for example, on the amount of surplus power available in the host system. Thus, at operation 224, the host controller may calculate if there is enough surplus power to provide the fourth maximum power level. At operation 226, the host controller may determine that enough surplus power is available, and at operation 228, the host controller may allocate the fourth maximum power level as the baseline power allocation for the device, and the method may terminate. Alternatively, at operation 230, the host controller may determine that enough surplus power is not available, and at operation 232, the host controller may allocate the fifth maximum power level as the baseline power allocation for the device, and the method may terminate.

In some embodiments, the method illustrated in FIG. 5 may be used, for example, for a hot insertion of a device. Depending on the implementation details, the method may enable a host controller to quickly determine a form factor and/or type (e.g., thick vs. thin) for determining a baseline power allocation to the device. After the device is initialized, and the baseline power level is established, negotiations may proceed between the device and host controller.

Although the method illustrated in FIG. 5 is not limited to any specific implementation details, in some embodiments, it may be implemented using scalable connectors such as, for example, those described in the SFF-TA-100X specification where X may be 2, 6, 7, 8, etc. In such an implementation, any of the first, second, third, fourth, and fifth power levels may correspond, for example, to 8 W, 10 W, 12 W, 16 W, 25 W, 40 W, 70 W, and/or any other power levels.

Figure 6:
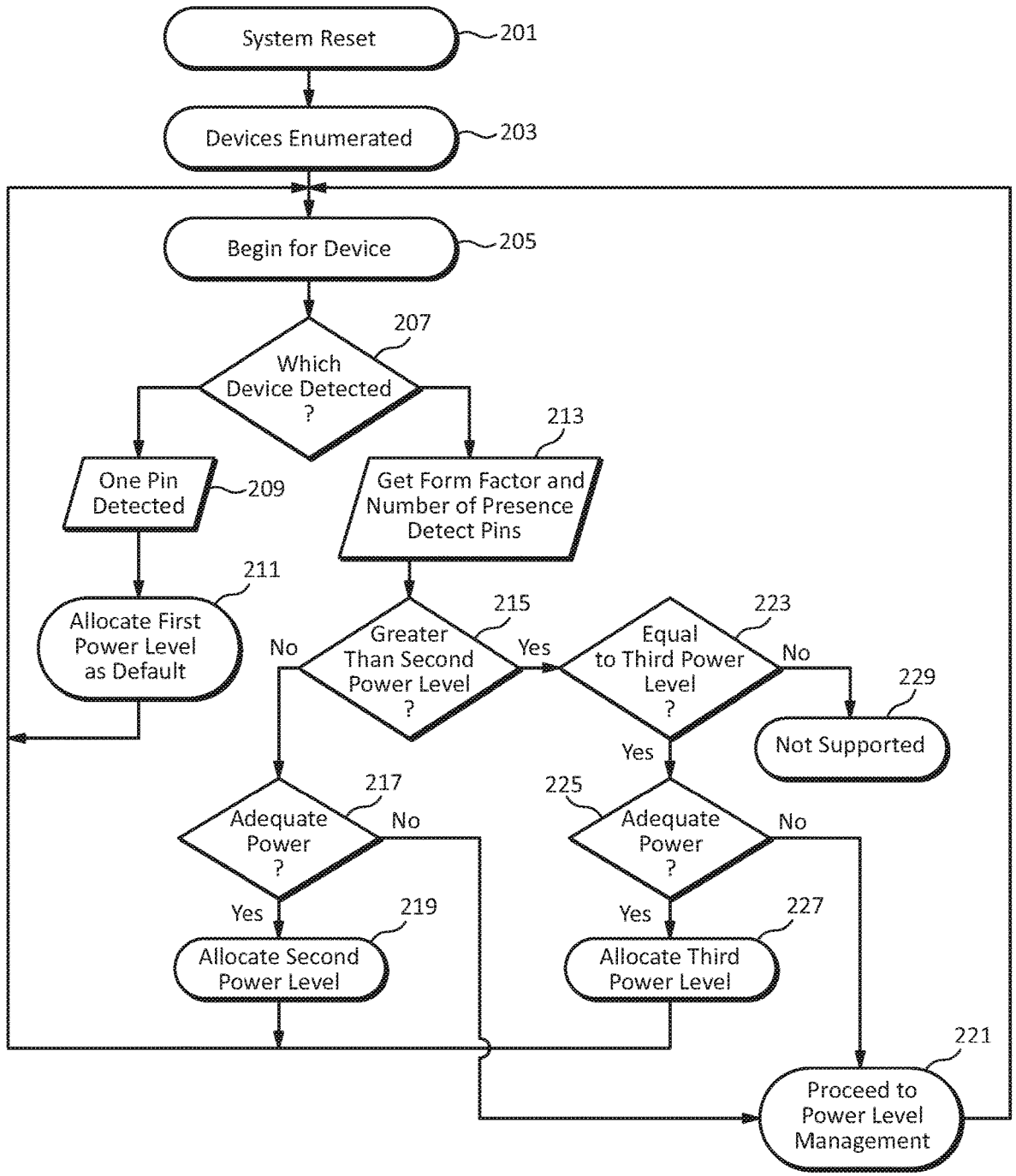
FIG. 6 illustrates a flowchart of an example embodiment of a method for determining a baseline power allocation for a device connected to a host system through a scalable connector during a system reset according to this disclosure.

FIG. 6 illustrates a flowchart of an example embodiment of a method for determining a baseline power allocation for a device connected to a host system through a scalable connector during a system reset according to this disclosure. The method may begin at operation 201 when the host system is reset (e.g., initialized, cold booted, and/or the like). At operation 203, one or more devices (for example, all devices) attached to the host system may be enumerated. At operation 205, a host controller may begin an instance of the following power allocation process for one or more enumerated devices (for example, for each enumerated device). At operation 207, the host controller may begin determining which type of device was detected in a slot, for example, by sensing the state of one or more presence detect pins, to determine a baseline power allocation for the device. At operation 209, the host controller may determine that one presence detect pin is sensed. At operation 211, a first power level may be allocated as the maximum power for the device, and the method may return to operation 205 to begin a power allocation process for another device.

Alternatively, after operation 207, the method may proceed to operation 213, where the host controller may obtain information about the device form factor and/or number of presence detect pins sensed which may be used to determine a baseline power allocation for the device. At operation 215, the host controller may determine if the device has a maximum baseline power level greater than a second power level. If not, at operation 217, the host controller may determine whether there is adequate power for the second power level. If there is adequate power, the second power level may be allocated as baseline power to the device, and the method may return to operation 205. Alternatively, at operation 217, if adequate power is not available, the method may proceed to a power level adjustment or management procedure at operation 221 before returning to operation 205.

After operation 215, if the host controller determines that the device has a maximum baseline power level greater than a second power level, the method may proceed to operation 223. At operation 223, if the host controller determines that the maximum baseline power consumption of the device is a third power level, the method may proceed to operation 225 where the host controller may determine whether there is adequate power for the third power level. If there is adequate power, the third power level may be allocated as baseline power to the device, and the method may return to operation 205. Alternatively, at operation 225, if adequate power is not available, the method may proceed to a power level adjustment or management procedure at operation 221 before returning to operation 205.

Alternatively, if the host controller determines at operation 223 that the maximum baseline power consumption of the device is not the third power level, this may indicate that the device may not be supported by the current system configuration. Thus, the method may terminate at operation 229. In some implementations, the method may return to operation 205.

Although the method illustrated in FIG. 6 is not limited to any specific implementation details, in some embodiments, it may be implemented using scalable connectors such as, for example, those described in the SFF-TA-100X specification where X may be 2, 6, 7, 8, etc. In such an implementation, the first, second, and third power levels may correspond to any suitable power levels.

Figure 7:
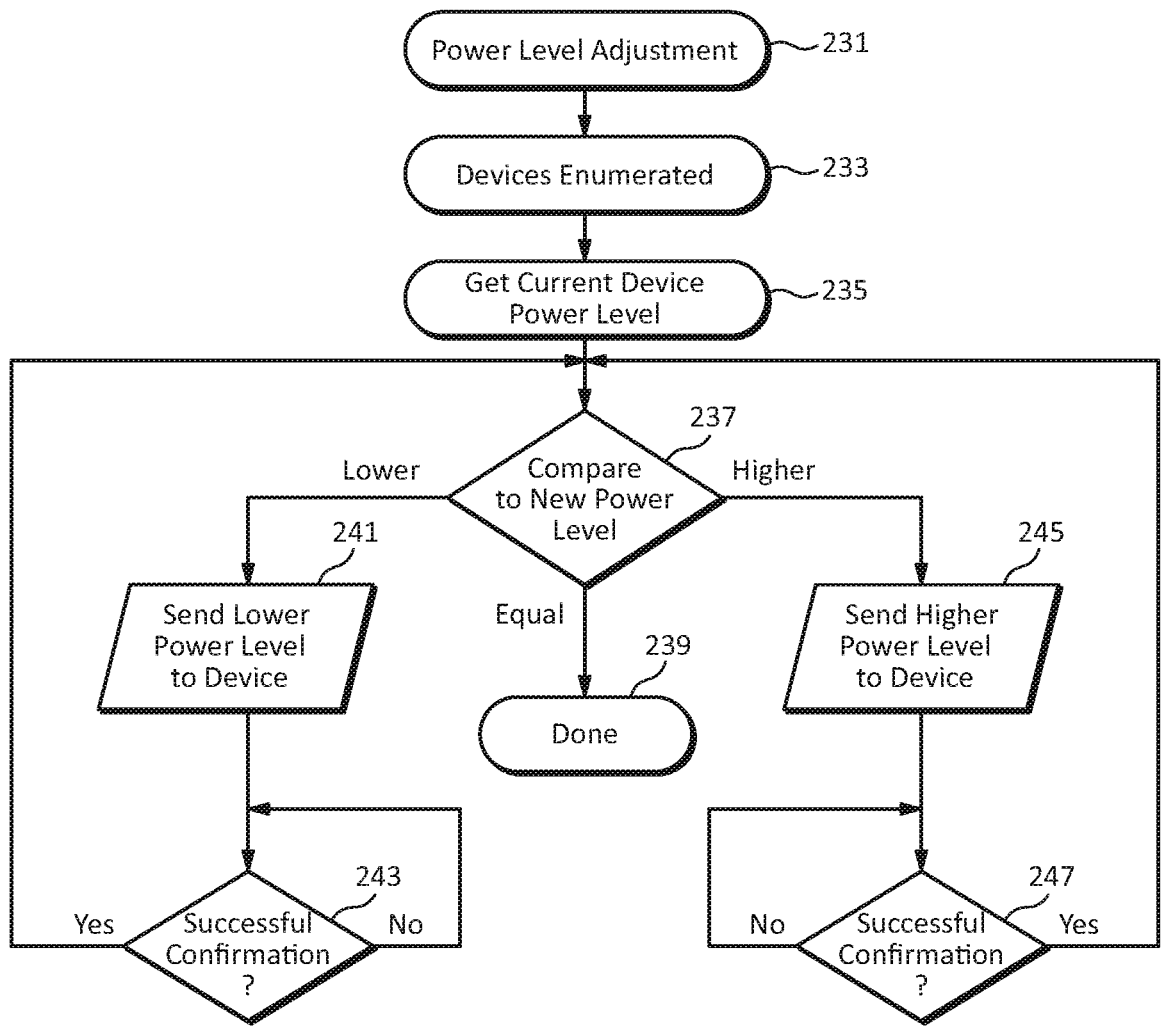
FIG. 7 illustrates a flowchart of an example embodiment of a method for adjusting a power allocation for a device connected to a host system through a connector according to this disclosure.

FIG. 7 illustrates a flowchart of an example embodiment of a method for adjusting a power allocation for a device connected to a host system through a connector according to this disclosure. The method may begin at operation 231 with a new proposed power allocation (e.g., a new proposed baseline allocation) for a device. In some embodiments at operation 233, the method may first determine that one or more devices (for example, all devices) connected to the host system have been enumerated. At operation 235, a host controller may obtain the current power allocation level for the device. This may be obtained, for example, from the device, from a record of current allocations maintained by the host controller, and/or in any other manner. At operation 237, the host controller may compare the current power allocation for the device to the proposed new allocation. If the allocations are equal, the method may terminate at operation 239. If the proposed new allocation is less than the current allocation, the host controller may send a command, request, and/or the like, to the device to reduce its current allocation to the new lower level at operation 241. The host controller may then wait for a successful confirmation at operation 243. After receiving the confirmation, the method may return to operation 237. Alternatively, if the proposed new allocation is greater than the current allocation, the host controller may send a command, request, and/or the like, to the device to increase its current allocation to the new higher level at operation 245. The host controller may then wait for a successful confirmation at operation 247. After receiving the confirmation, the method may return to operation 237.

Although not limited to any specific implementation details, in some embodiments, the method illustrated in FIG.

7 may be implemented by adjusting one level at a time up or down. Depending on the implementation details, this may simplify the design of power management logic.

In some embodiments, the method illustrated in FIG. 7 may be used to implement a request for an allocation or deallocation of power from any source of a request, including sources other than the host or the device. For example, a user may send a request to a host requesting that the host increase or decrease the power allocation to one or more devices. A request may be sent to a host through any communication channel such as, for example, a network interface such as Ethernet, Fibre Channel, InfiniBand, and/or the like.

In some embodiments, after a baseline power allocation for the host system has been determined (which may initially be determined, for example, at system reset and updated based on hot insertions and/or removals), the total system power allocation may be dynamically adjusted by adding and/or subtracting various power allocations at different times based on many different factors. Examples of factors may include one or more characteristics and/or features of the devices, one or more power allocations strategies that may be implemented by the host controller, any service level agreements (SLAs) that may be in place for one or more devices, and/or the like.

In some embodiments, a device may be described as boost-enabled, for example, if it is capable of requesting a boost power allocation in addition to its baseline maximum power allocation. In some embodiments, a boost power request may be implemented in an active manner in which the device may, at its own initiative, send a request for boost power to a host controller. Alternatively, or additionally, a boost power request may be implemented in a passive manner in which the device may wait to be polled by the host controller (e.g., in a round-robin manner) to request a boost power allocation.

In some embodiments, a boost power request may include a specific amount of boost power being requested by the device. Alternatively, or additionally, a predetermined amount of boost power may be designated for a device, for example, during a system reset operation, that the host controller may allocate to the device in response to a boost power request.

In some embodiments, a boost power allocation may be implemented as a positive amount in which a device may draw surplus power from one or more PSUs. Alternatively, or additionally, boost power may be implemented as a negative amount in which the maximum amount of power the device is allowed to draw may be reduced, for example, from a baseline amount.

In some embodiments, the baseline and/or boost power consumption of a device may be controlled by a host system controller. In some embodiments, a host controller may control the maximum power level of a device on a mandatory basis. For example, the host controller may issue a command specifying a maximum power level for the device, and the device may be required to conform to the maximum power level specified by the host controller. For example, a device that is compatible with the NVMe Cloud SSD Specification may be commanded by a host controller to reduce its maximum power consumption to one of several predetermined power levels. In some embodiments, a host controller may control or attempt to control the maximum power level of a device on an optional or voluntary basis. For example, the host controller may request that the device observe a specified maximum power level. The device may acknowledge the request and limit its maximum power consumption to the requested level, or the device may decline the request and continue to operate at a different maximum power level such as, for example, a baseline power allocation determined at system reset or hot insertion.

In some embodiments, a device may implement a power monitoring feature that may enable a host controller to determine the amount of power actually consumed by a device. For example, a power monitoring unit (PMU) within a device may measure the amount of current drawn through a connector on one or more power supply rails and report these measurements to the host controller through a communication channel such as, for example, the one or more communication channels 116 illustrated in FIG. 1.

In some embodiments, a device may implement any number of these features and/or any combination thereof.

Figure 8:
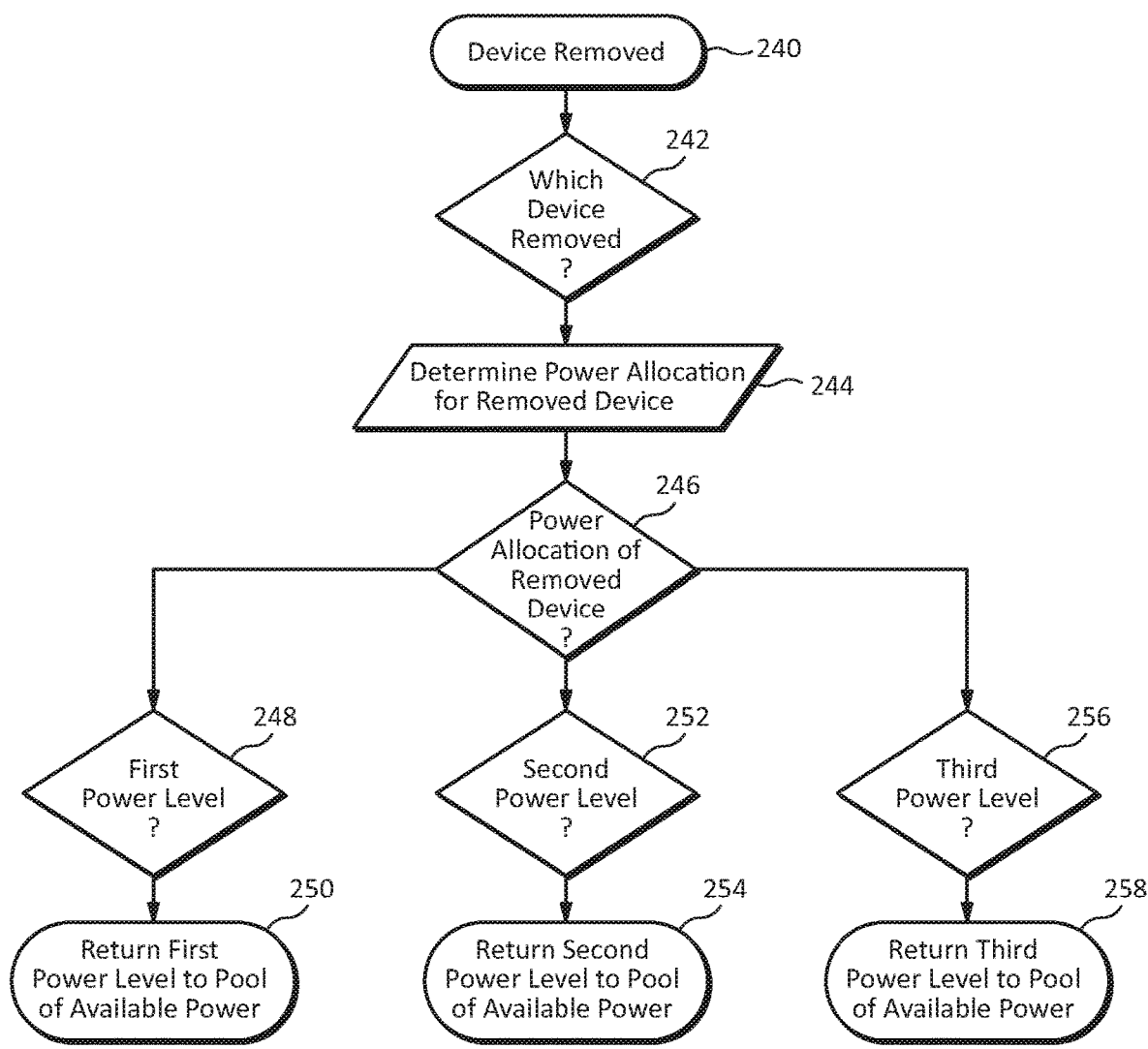
FIG. 8 illustrates a flow chart of an embodiment of a method for deallocating power to a device that is removed from a host according to this disclosure.

FIG. 8 illustrates a flow chart of an embodiment of a method for deallocating power to a device that is removed from a host system according to this disclosure. The method may begin at operation 240 when a device is removed from the host system, for example, by unplugging it from a connector. At operation 242, a host controller may determine which device was removed from the host system. At operation 244, the host controller may retrieve information such as device type, baseline power allocation, and/or the like about the device that was removed. At operation 246, the host controller may determine the power allocation for the device that was removed. In some embodiments, this may be a baseline power allocation for the device. In some embodiments, this may be a total of, for example, a baseline power allocation plus any boost power allocation if the device was in boost mode at the time of removal. After operation 246, the host controller may determine at operation 248 that the device had a first power allocation which may be added back to the pool of available power at operation 250, and the method may end. Alternatively, after operation 246, the host controller may determine at operation 252 that the device had a second power allocation which may be added back to the pool of available power at operation 254, and the method may end. Alternatively, after operation 246, the host controller may determine at operation 256 that the device had a third power allocation which may be added back to the pool of available power at operation 258, and the method may end. In other embodiments, any number of power allocation levels may be determined and added back to the pool of available power.

Figure 9:
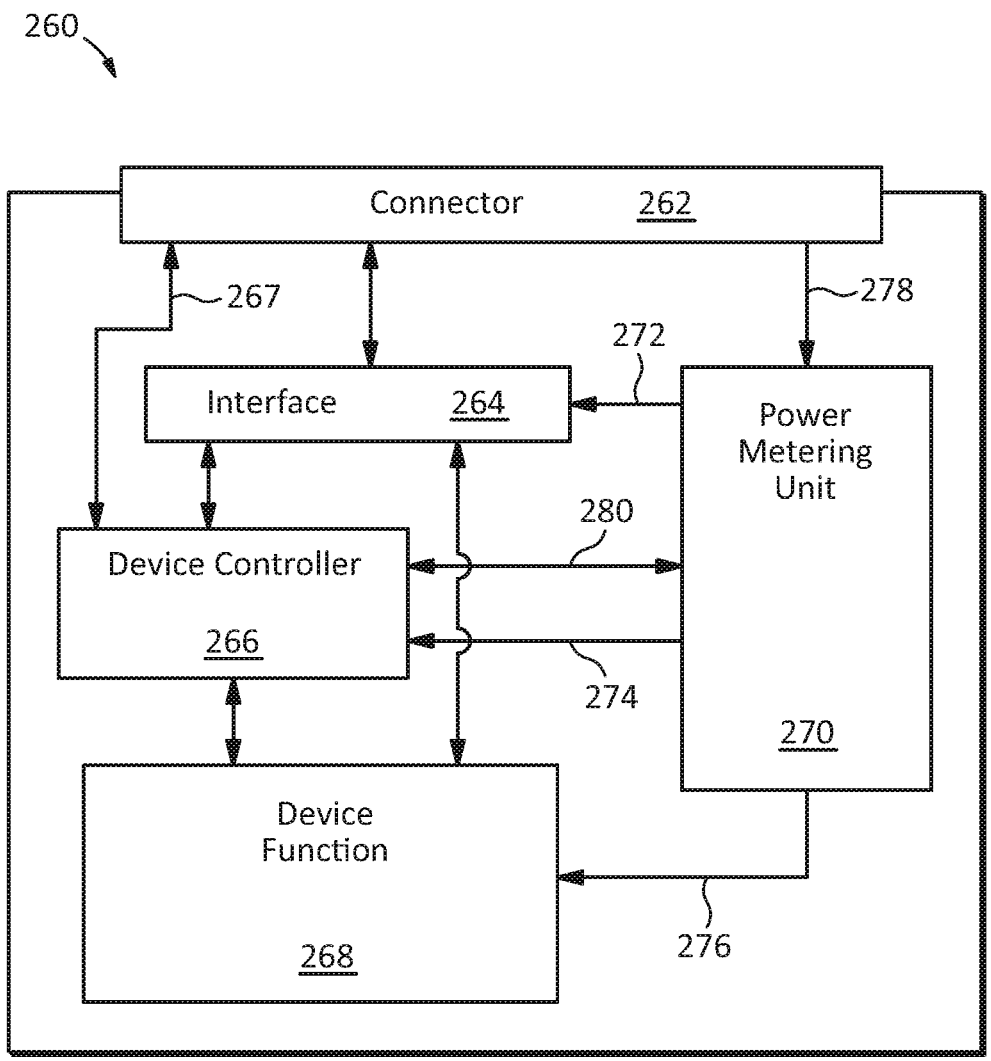
FIG. 9 illustrates an example embodiment of a device that may monitor and report power usage according to this disclosure.

FIG. 9 illustrates an example embodiment of a device that may monitor and report power usage according to this disclosure. The device 260 illustrated in FIG. 7 may include a connector 262, an interface 264, a device controller 266 and a device function block 268 which may be similar to those in the embodiment illustrated in FIG. 2. For example, the device controller 266 may include any hardware, software, and/or combination thereof for performing any functions associated with requesting and/or receiving boost power, and the device function block 268 may include any hardware, software, and/or combination thereof for performing one or more functions of the device. However, the embodiment illustrated in FIG. 9 may also include a power metering unit 270 which may measure the amount of power consumed by the device 260 and report it back to a system controller. For example, in some embodiments, the power metering unit 270 may measure the current draw on various power rails that may be used by various components within the device 260. In some embodiments, the power metering unit 270 may communicate with the device controller 266 through a communication channel 280 which may be implemented, for example, with an SMBus, LPC bus, GPIO lines, and/or any other type of communication channel. The power metering unit 270 may transfer power monitoring data to the device controller 266 which may then forward the data to a host system controller through communication channel 267. In other embodiments, the power metering unit 270 may communicate with the host system controller through a separate communication channel which may pass through the connector 262, or in any other manner.

The power metering unit 270 may be implemented with hardware, software and/or any combination thereof. Although shown as a single, separate component, the functions of the power metering unit 270 may be distributed among multiple components and/or may be integrated into one or more other components. In some embodiments, the power metering unit 270 may be located outside of the device 260, for example on a circuit board on which a connector for the device is mounted.

In some embodiments, the power metering unit may also perform one or more power management functions such as distributing, conditioning, transforming and/or otherwise processing power received through the connector 262 to make it suitable for the other components. For example, the power metering unit 270 may receive a 12 V supply, a 3.3 V supply and/or other power supplies 278 and transform them to an interface voltage rail 272, a controller voltage rail 274, and/or a device function block voltage rail 276.

In some embodiments, the power metering unit 270 may record the power measurements periodically. The power measurements may be annotated with information such as time-stamps, current host identifier (ID), and/or the like. The power measurements may be preserved through system resets and/or power cycles and stored in logs which may be transferred to a host system controller through the device controller 266 or through any suitable communication channels, protocols, and/or the like.

Figure 10:
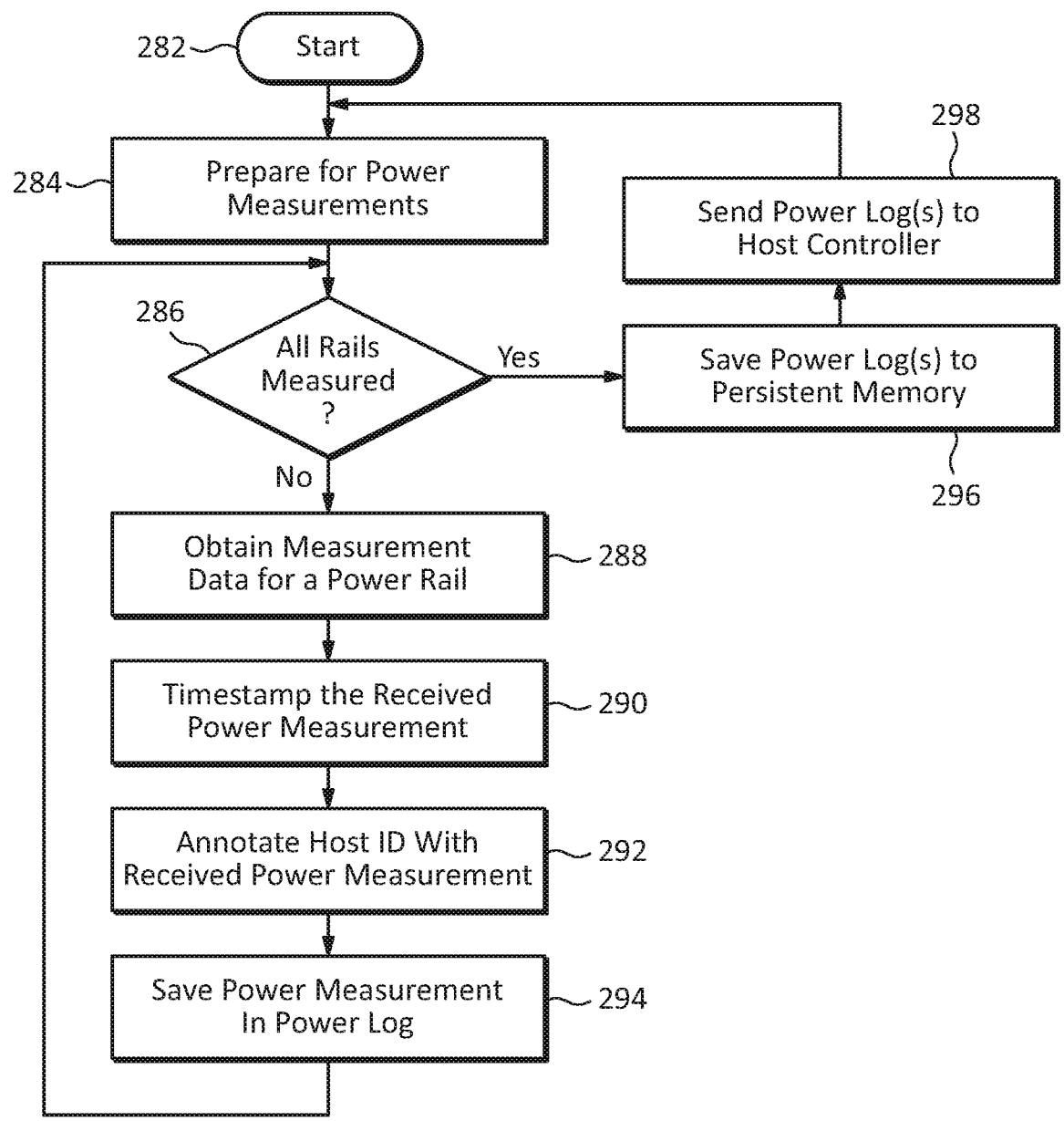
FIG. 10 is a flow chart illustrating an example embodiment of a method for collecting power consumption data in a device according to this disclosure.

FIG. 10 is a flow chart illustrating an example embodiment of a method for collecting power consumption data in a device according to this disclosure. The method, which may be implemented, for example, using the power metering unit 270 illustrated in FIG. 9, may begin at operation 282. At operation 284, the method may prepare for power measurements, for example, by implementing a time interval between measurements (e.g., five seconds). At operation 286, the method may check if measurements have been received from all power rails. If not, the method may proceed to operation 288 where measurement data may be obtained for a power rail. At operation 290, the received power measurement may be annotated with a time stamp. At operation 292, the received power measurement may be annotated with a host ID. At operation 294, the power measurement including annotations may be saved in a power log. The method may then return to operation 286. After measurements have been received from all power rails, the method may proceed to operation 296 where one or more power logs may be saved to persistent memory. At operation 298, the one or more power logs may be sent to a host system controller, and the method may return to operation 284.

Figure 11:
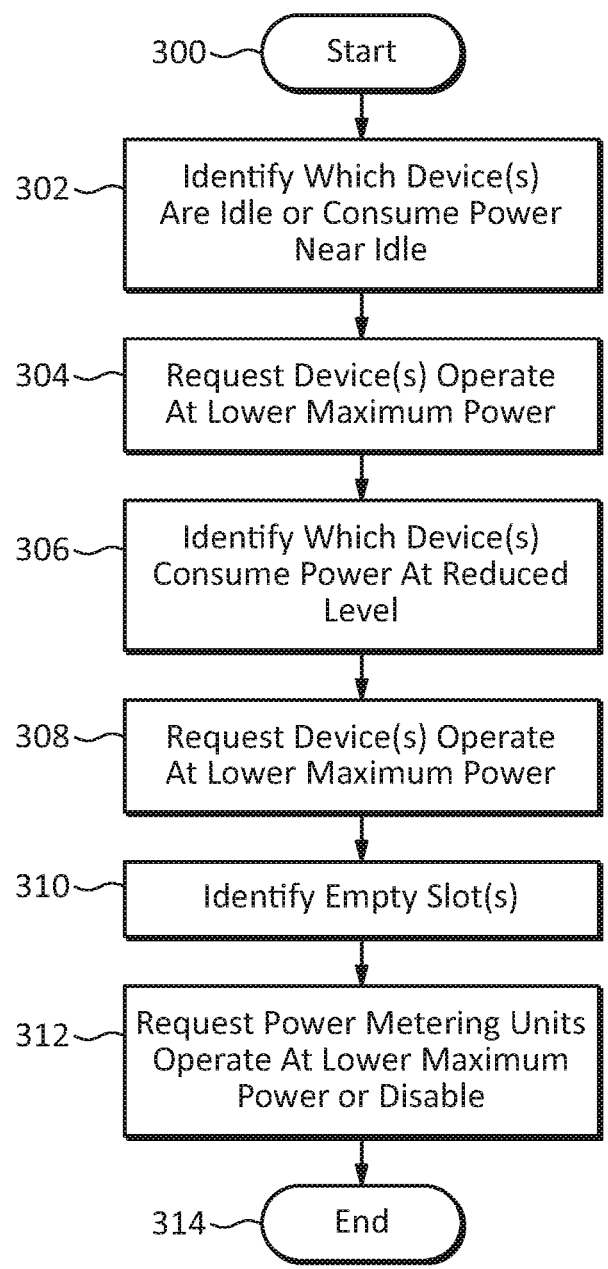
FIG. 11 is a flow chart illustrating an example embodiment of a method for dynamically reducing allocated power in a host system according to this disclosure.

FIG. 11 is a flow chart illustrating an example embodiment of a method for dynamically reducing allocated power in a host system according to this disclosure. The method illustrated in FIG. 11 may be used, for example, by a host system controller where one or more devices may implement a power monitoring feature such as that disclosed in FIG. 10. The method illustrated in FIG. 11 may be used, for example, to reduce a baseline and/or boost power allocation for a device so that the power may be reallocated to another device that may have requested a boost power allocation.

Referring again to FIG. 11, the method may begin at operation 300. At operation 302, the controller may identify one or more devices may be idle and/or consuming power near an idle level. This may be determined, for example, by obtaining one or more power measurements from the device, and comparing it to an idle threshold base on a percentage of maximum power, an absolute power level, and/or in any other manner. At operation 304, the controller may request that one or more devices that may be idle and/or consuming power near an idle level to continue to operate at the lower power level (e.g., by using the lower power level as a new maximum power allocation). The request may be made on an optional or voluntary basis, or on a mandatory basis (i.e., the request may essentially be a command).

At operation 306, the controller may identify one or more devices may be consuming power at one or more other power levels that may be less than their allocated maximum power level, for example, 75 percent of maximum, 50 percent of maximum, etc. At operation 308, the controller may request (on an optional and/or voluntary basis) that one or more devices that may be operating such a reduced power level continue to operate at the lower power level (e.g., by using the lower power level as a new maximum power allocation). At operation 310, the controller may identify one or more empty connectors (e.g., connectors associated with slots). At operation 312, the controller may request that one or more power metering units that may be associated with the one or more empty connectors, and which may be located outside of a device, operate at a lower power allocation (e.g., an idle power level) and/or disable. The method may then end at operation 314.

Figure 12:
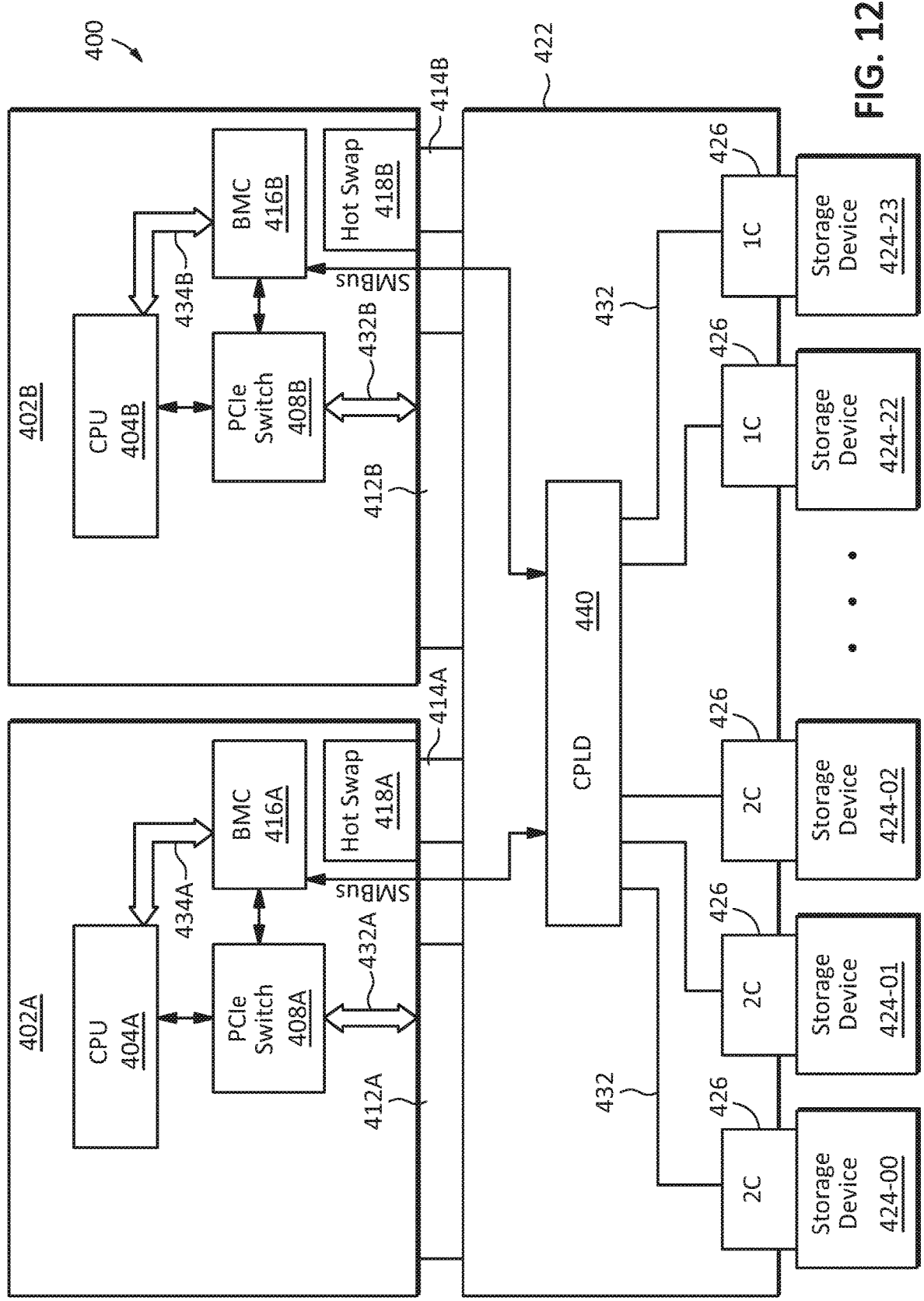
FIG. 12 illustrates an example embodiment of a host system that may provide boost power to devices through connectors according to this disclosure.

FIG. 12 illustrates an example embodiment of a host system that may provide boost power to devices through connectors according to this disclosure. For purposes of illustration, the embodiment illustrated in FIG. 12 may be described in the context of a storage system 400 that may use SFF-TA-100X connectors for SSDs, but the inventive principles are not limited to any specific type of system, device, connector, and/or the like.

The system 400 may include two motherboards 402A and 402B. A first one of the motherboards 402A may include a CPU 404A, one or more high-speed connectors 412A, one or more additional connectors 414A, a baseboard management controller (BMC) 416A, and a hot swap controller 418A The first motherboard 402A may be connected to a midplane 422 through the one or more high-speed connectors 412A and the one or more additional connectors 414A. The second motherboard 402B may be connected to the midplane 422 through the one or more high-speed connectors 412B and the one or more additional connectors 414B.

Storage devices 424-00 through 424-23, which may be referred to collectively as 424, may be connected to the midplane 422 through storage device connectors 426. In this example, there may be up to 24 or more storage devices, but the system may be configured to accommodate any number of storage devices. Although this configuration is not limited to any specific type of storage devices or connectors, in this example embodiment, connectors 426 may be implemented with SFF-TA-100X connectors.

On the first motherboard 402A, a PCIe switch 408A may be connected to the one or more high-speed connectors 412A through conductive traces, cables, or any suitable connection arrangement 432A to provide, for example, four lanes of PCIe for each of the storage devices 424. PCIe clock distribution functionality may be provided separate from, or integral with, the PCIe switch 408A. The CPU 404A may include local supporting resources such as memory, local storage, a power source, etc. The CPU 404A may perform various system management functions, as well as enabling data transfers to the storage devices 424 through the PCIe switch 408A, for example using an NVMe protocol. The CPU 404A may be connected to the PCIe switch 408A, and BMC 416A through links having various numbers of PCIe lanes of various generational speeds as may be appropriate for the expected traffic as shown by the arrows in FIG. 12. The BMC 416A may also be connected to the PCIe switch 408A through a PCIe link as shown by the arrow in the figure. The BMC 416A may be connected to the CPU 404A through a low pin count (LPC) interface 434A.

A system management bus (SMBus) may be connected between the BMC 416A and the midplane 422 and/or storage devices 424 through one of the additional connectors 414A, through a dedicated connector, or in any other suitable manner. The one or more additional connectors 414A may provide a board-to-board power connection between the hot swap controller 418A and the storage devices 424 through the midplane 422.

The second motherboard 402B may include essentially the same components and connections as the first motherboard 402A, but with reference numbers ending in B instead of A.

On left side of the midplane 422, storage devices 424-00 through 424-02 may be connected to the midplane through 2C connectors, which may indicate that the storage devices may be provided with a baseline power allocation of, for example, 35 watts. On right side of the midplane 422, storage devices 424-22 and 424-23 may be connected to the midplane through 1C connectors, which may indicate that the storage devices may be provided with a baseline power allocation of, for example, 25 watts.

The embodiment illustrated in FIG. 12 may also include one or more CPLDs 440 configured to detect the state of one or more presence detect pins on the connectors for the storage devices. The one or more CPLDs 440 may be connected to the presence detect pins on one or more of the connectors through traces 432. Although shown as single traces, there may be multiple traces to detect the state of multiple pins on each connector. The one or more CPLDs 440 may communicate with the BMCs 416A and 416B through, for example, the SMBus over I2C as shown in FIG. 12, or through GPIO terminals, an LPC bus, and/or the like. The one or more CPLDs 440 may enable the BMCs to determine the type, form factor, and/or the like, of devices plugged into the connectors. Although the one or more CPLDs 440 are shown in the midplane 422, in other embodiments, they may be located on the motherboards, on one or more separate boards, or any other suitable location.

Figure 13:
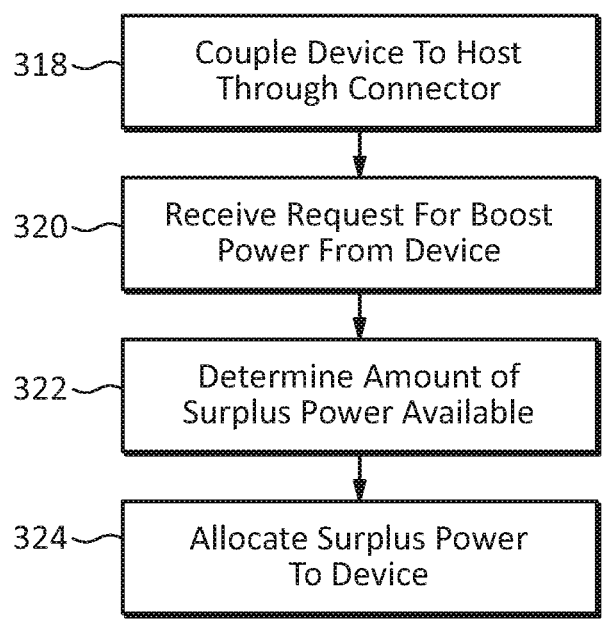
FIG. 13 illustrates another embodiment of a method for allocating power to a device through a connector according to this disclosure.

FIG. 13 illustrates another embodiment of a method for allocating power to a device through a connector according to this disclosure. The method may begin at operation 318 by coupling a device to a host through a connector. The method may further include, at operation 320, receiving, by a host controller, a request for boost power from the device. The method may further include, at operation 322, determining, by the host controller, an amount of surplus power available from one or more power sources to the device through the connector. The method may further include, at operation 324, allocating at least a portion of the surplus power to the device as boost power.

The operations and/or components described with respect to the embodiment illustrated in FIG. 13, as well as any other embodiments described herein, are example operations and/or components. In some embodiments, some operations and/or components may be omitted and/or other operations and/or components may be included. Moreover, in some embodiments, the temporal and/or spatial order of the operations and/or components may be varied.

In some embodiments, and depending on the implementation details, one or more systems, methods, and/or devices according to this disclosure may provide one or more benefits and/or advantages. For example, dynamically adjusting power (up and/or down) based on, for example, device workloads may reduce costs, in some implementations without compromising the performance of devices that may be able to utilize more power than may otherwise be allocated to them.

In some embodiments, and depending on the implementation details, one or more systems, methods, and/or devices according to this disclosure may improve performance and/or enable power to be provisioned more effectively and/or efficiently for loads involving artificial intelligence (AI) and/or machine learning (ML), which may otherwise be difficult to provision.

In some embodiments, and depending on the implementation details, one or more systems, methods, and/or devices according to this disclosure may be implemented with few or no changes to connectors, midplanes, chassis, and/or the like.

In some embodiments, and depending on the implementation details, one or more systems, methods, and/or devices according to this disclosure may improve performance and/or enable power to be provisioned more effectively and/or efficiently for computational storage acceleration workloads which may occasionally exceed their maximum power allocation during certain computational tasks.

In some embodiments, and depending on the implementation details, one or more systems, methods, and/or devices according to this disclosure may improve performance and/or enable power to be provisioned more effectively and/or efficiently compared to systems in which devices may employ performance and/or power throttling to keep power consumption within specified maximum power levels.

In some additional embodiments, power may be disabled to a storage or other device through a connector (e.g., a scalable connector) in response to one or more problematic condition such as, for example, an SSD that may not operate correctly, short circuits, and/or other types of malfunctions and/or conditions. For example, power may be disabled if a standard NVMe device is installed in a connector intended for an NVMe-oF device. Power may be disabled, for example, using a power disable which may be defined in scalable connector, which may notify the device to turn off one or more systems connected to one or more power supply rails.

In some embodiments, a host controller, for example, a service processor such as a BMC, may create one or more power profiles and/or use cases based on obtaining power consumption measurements from a device. For example, a host controller may read power measurements periodically from one or more devices coupled to a chassis through one or more connectors, which in some embodiments may be implemented with one or more scalable connectors. In some embodiments, an NVMe-MI protocol may be used over SMBus, PCIe, and/or the like, to read power log pages that may be created, for example, by a device that may monitor power consumption. The read power data may be processed to show trends, diagnostics purposes, and/or the like.

Figure 14:
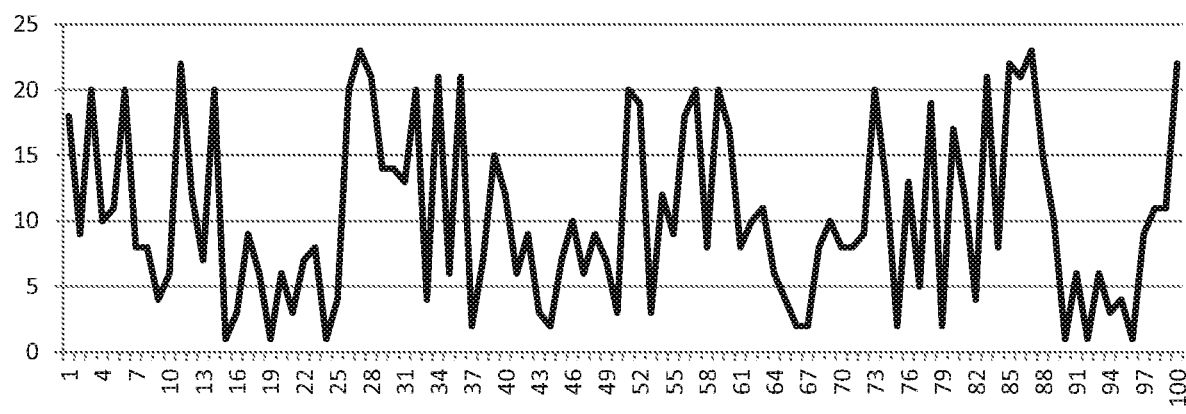
FIG. 14 illustrates an example of power consumption by a device with a power monitoring feature according to this disclosure.

FIG. 14 illustrates an example of power consumption by a device with a power monitoring feature according to this disclosure. The example illustrated in FIG. 14 may show raw power consumption (for example, watts/hour) over a period of time. Some embodiments may provide graphs of different combinations of parameters that may demonstrate power consumption behavior with respect to time. Some examples of graphs that may be created according to this disclosure may include whole chassis power consumption over time, power consumption during daytime, nighttime, weekdays, weekends, and/or the like, long term power consumption on a monthly/yearly basis, etc., and/or the like.

In some embodiments, power consumption data obtained according to this disclosure may be used for a variety of purposes including power provisioning, determination of future requirements, cooling, planning, and/or the like. In some embodiments, host ID information annotated with power consumption measurements may be used, for example, to profile the power consumption by various hosts or applications. Such information may provide insights into storage power needs for various applications, may be used to calculate storage costs per host or application, and/or the like.

The embodiments disclosed above have been described in the context of various implementation details, but the principles of this disclosure are not limited these or any other specific details. For example, some functionality has been described as being implemented by certain components, but in other embodiments, the functionality may be distributed between different systems and components in different locations and having various user interfaces. Certain embodiments have been described as having specific processes, steps, etc., but these terms also encompass embodiments in which a specific process, step, etc. may be implemented with multiple processes, steps, etc., or in which multiple process, steps, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not to indicate any spatial or temporal order unless apparent otherwise from context. A reference to a first thing may not imply the existence of a second thing.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method comprising:
providing power from a host to a device using a connector, wherein the connector is configured to carry a first communication channel, and a second communication channel;
communicating, using the first communication channel, between the host and a device function of the device;
assigning a power allocation to the device;
receiving, by the host, from the device, using the second communication channel, a request for power, wherein the request for power is caused by the device;
determining, by the host, a level of power available from one or more power sources; and
sending, from the host, to the device, using the second communication channel, based on the request for power, a response based, at least in part, on the level of power available from the one or more power sources.

2. The method of claim 1, wherein the response comprises an offer of power.

3. The method of claim 1, further comprising negotiating, by the host and the device, the power allocation.

4. The method of claim 1, further comprising modifying, based on the request, at least a portion of the power allocation.

5. The method of claim 1, wherein the device is a first device, the connector comprises a first connector, and the method further comprises allocating at least a portion of the power allocation to a second device connected to the one or more power sources using a second connector.

6. The method of claim 1, wherein the power allocation is allocated to the device for an operation.

7. The method of claim 6, further comprising:
determining a status of the operation; and
modifying the power allocation based on the determining the status of the operation.

8. The method of claim 7, wherein the status of the operation is determined, at least in part, by the device.

9. The method of claim 7, wherein the status of the operation is determined, at least in part, by the host.

10. The method of claim 1, further comprising modifying the power allocation based on a power consumption of the device.

11. The method of claim 1, wherein the device comprises a first device, the connector comprises a first connector, the power allocation comprises a first power allocation, and the method further comprises:
providing power from a host to a second device using a second connector; and
allocating a second power allocation to the second device.

12. The method of claim 1, wherein the response comprises a denial.

13. The method of claim 1, wherein the request comprises a request for a boost portion, the method further comprising modifying the power allocation based on the boost portion.

14. A system comprising:
a connector capable of being connected to a device to provide power to the device from one or more power sources, wherein the connector is configured to carry a first communication channel, and a second communication channel; and
a controller configured to:
communicate, using the first communication channel, with a device function of the device;
allocate a power allocation to the device;
receive, from the device, using the second communication channel, a request for power, wherein the request for power is caused by the device;
determine a level of power available from one or more power sources; and
send, to the device, using the second communication channel, based on the request for power, a response based, at least in part, on the level of power available from one or more power sources.

15. The system of claim 14, wherein the power allocation is determined, at least in part, by a type of the connector.

16. The system of claim 14, wherein the power allocation is determined, at least in part, by one or more presence detect terminals on the connector.

17. The system of claim 14, wherein the power allocation is determined, at least in part, by communicating with the device using the connector.

18. The system of claim 14, wherein the controller comprises a service processor.

19. The system of claim 18, wherein the service processor comprises a baseboard management controller.

20. A system comprising:
- a first connector capable of being connected to a first device to provide power to the first device from one or more power sources, wherein the first connector is configured to carry a first communication channel, and a second communication channel;
- a second connector capable of being connected to a second device to provide power to the second device from the one or more power sources; and
- a controller configured to:
  - communicate, using the first communication channel, with a device function of the first device;
  - allocate a first power allocation to the first device;
  - receive, from the first device, using the second communication channel, a request for power, wherein the request for power is caused by the device;
  - determine a level of power available from the one or more power sources; and
  - send, to the device, using the second communication channel, based on the request for power, a response based, at least in part, on the level of power available from the one or more power sources;
  - receive, from the first device, using the first connector, a measurement of a power consumption of the first device; and
  - perform a modification operation comprising allocating, based on the measurement, at least a portion of the first power allocation to the second device, wherein the modification operation is caused by the controller.

* * * * *